United States Patent
Seifi et al.

(10) Patent No.: US 10,148,906 B2
(45) Date of Patent: Dec. 4, 2018

(54) METHODS, APPARATUS, AND SYSTEMS FOR EXTENDED HIGH DYNAMIC RANGE ("HDR") HDR TO HDR TONE MAPPING

(71) Applicant: THOMSON LICENSING, Issy les Moulineaux (FR)

(72) Inventors: Mozhdeh Seifi, Thorigne-Fouillard (FR); Erik Reinhard, Hédé-Bazouges (FR); Guillaume Poirier, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/460,254

(22) Filed: Mar. 16, 2017

(65) Prior Publication Data

US 2017/0272690 A1     Sep. 21, 2017

(30) Foreign Application Priority Data

Mar. 16, 2016 (EP) ..................... 16305291

(51) Int. Cl.
| | |
|---|---|
| H04N 7/01 | (2006.01) |
| H04N 5/355 | (2011.01) |
| G06T 5/00 | (2006.01) |

(52) U.S. Cl.
CPC ............ *H04N 7/01* (2013.01); *G06T 5/009* (2013.01); *H04N 5/355* (2013.01); *G06T 2207/20208* (2013.01)

(58) Field of Classification Search
CPC .......... H04N 7/01; H04N 5/355; G06T 5/009
(Continued)

(56) References Cited

U.S. PATENT DOCUMENTS 6,236,751 B1   5/2001  Farrell
7,612,804 B1 * 11/2009  Marcu .................. G06T 5/50
                                                       348/222.1
(Continued)

FOREIGN PATENT DOCUMENTS

| EP | 1130545 | 9/2001 |
|---|---|---|
| EP | 1845704 | 10/2007 |
| WO | WO2010024782 | 3/2010 |

OTHER PUBLICATIONS

Reinhard et al., "Chapter 8: Tone-Reproduction Operators", High Dynamic Range Imaging, Aquisition, Display, and Image-Based Lighting, The Morgan Kaufmann Series in Computer Graphics, Elsevier Inc., New York, 2006, pp. 277-400.

Kim et al., "Natural HDR image Tone Mapping Based on Retinex", IEEE Transactions on Consumer Electronics, vol. 57, No. 4, Nov. 2011, pp. 1307-1314.

(Continued)

*Primary Examiner* — Sinh Tran
*Assistant Examiner* — Zhenzhen Wu
(74) *Attorney, Agent, or Firm* — Brian J. Dorini; Patricia A. Verlangieri (57) ABSTRACT

Aspects of present principles are directed to methods and apparatus for tone mapping a high dynamic range image. The apparatus includes a processor for performing the following and the method includes the following: obtaining a luminance component of the high dynamic range image; determining an HDR to HDR tone mapper curve; determining a tone compressed image by applying the HDR to HDR tone mapper curve to the luminance component of the high dynamic range image; wherein the HDR to HDR tone mapper curve comprises a first part for dark and mid-tone levels, and a second part for highlights.

21 Claims, 7 Drawing Sheets

(58) Field of Classification Search
USPC .......................................... 348/231.99, 222.1
See application file for complete search history.

(56) References Cited

U.S. PATENT DOCUMENTS

| | | |
|---|---|---|
| 2005/0128358 A1 | 6/2005 | Nakajima et al. |
| 2008/0259181 A1 | 10/2008 | Yamashita et al. |
| 2009/0060367 A1 | 3/2009 | Wei |
| 2009/0066715 A1 | 3/2009 | Chen |
| 2009/0317017 A1 | 12/2009 | Au et al. |
| 2010/0283861 A1* | 11/2010 | Tamagawa ............ G06T 5/007 348/222.1 |
| 2011/0176024 A1* | 7/2011 | Kwon ............... H04N 5/23232 348/222.1 |
| 2011/0194618 A1* | 8/2011 | Gish ..................... G06T 5/50 375/240.25 |
| 2011/0292246 A1 | 12/2011 | Brunner |
| 2013/0083248 A1 | 4/2013 | Suzuki |
| 2013/0329995 A1 | 12/2013 | Webb et al. |
| 2014/0267822 A1* | 9/2014 | Roffet .................. H04N 5/225 348/222.1 |

OTHER PUBLICATIONS

Bhandari et al., "Dark sateiiite image enhancement using knee transfer function and gamma correction based on DWT-SVD", Multidimensional Systems and Signal Processing, vol. 27, No. 2, Jan. 6, 2015, pp. 453-476.

Ofili, "An Automated Hardware-based Tone Mapping System for Displaying Wide Dynamic Range Images", Master Thesis in Electrical and Computer Engineering, University of Calgary, Alberta, Canada, May 2013, pp. 1-208.

Reinhard et al., "Photographic Tone Reproduction for Digital Images", ACM Transactions on Graphics (TOG), Proceedings of ACM SIGGRAPH 2002, vol. 21, No. 3, Jul. 2002, pp. 267-276.

Seetzen et al., "High Dynamic Range Display Systems", ACM Transactions on Graphics (TOG), Proceedings of ACM SIGGRAPH 2002, vol. 23, No. 3, May 2004, pp. 1-9.

Seetzen et al., "P. 54.2: A High Dynamic Rude Display Using Low and High Resolution Modulators", SID Symposium Digest of Technical Paper, vol. 34, No. 1, (2003), pp. 1450-1453.

Tocci et al., "A Versatile HDR Video Production System", ACM Transactions on Graphics (TOG), Proceedings of ACM SIGGRAPH, vol. 30, No. 4, Article No. 41, Jul. 2011, pp. 1-9.

* cited by examiner

METHODS, APPARATUS, AND SYSTEMS FOR EXTENDED HIGH DYNAMIC RANGE ("HDR") HDR TO HDR TONE MAPPING

REFERENCE TO RELATED EUROPEAN APPLICATION

This application claims priority from European Patent Application No. 16305291.3, entitled "METHODS, APPARATUS, AND SYSTEMS FOR EXTENDED HIGH DYNAMIC RANGE ("HDR") HDR TO HDR TONE MAPPING", filed on Mar. 16, 2016, the contents of which are hereby incorporated by reference in its entirety.

TECHNICAL FIELD

The present disclosure relates to image and video processing. In particular, the present disclosure relates to extended High Dynamic Range ("HDR") to HDR tone mapping.

BACKGROUND

Light in nature covers an enormous range of luminance levels, from starlight to bright sunlight. Yet traditional imaging technologies, both digital and analog, offer diminished experience because they cannot parallel the wide range of luminance and contrast that is visible to our eyes. In response, HDR technologies are being developed to allow an extended range of color, luminance and contrast to be displayed.

HDR technologies focus on capturing, processing and displaying content of a dynamic range wider than SDR technologies. Today, HDR capabilities of HDR displays may vary, notably according to their maximum peak white luminance: some HDR display may offer 500 nits as other one may reach 1000 nits or even 1500 nits.

Although HDR displays and cameras to capture HDR content are presently in development, HDR content need to undergo HDR to LDR tone mapping for legacy displays to be able to reproduce the content. Similarly, a HDR content prepared for instance for a 1000 nits HDR display need to undergo HDR to "lower-HDR" tone mapping for instance for a 500 nits HDR display to be able to reproduce the content. There is therefore a need for HDR to "lower-HDR" tone mapping.

Tone reproduction, also known as tone mapping, aims to map an image's original range of luminance values to a lower range of luminance values that can be reproduced by a display. Often, but not always, tone mapping is carried out on a luminance channel that is derived from an input HDR color image. The output of the tone mapping can be recombined with the color information retained from the input original HDR image, so that a new output color image is produced with a HDR dynamic range lower than the input HDR image.

Tone mapping algorithms can be classified into two broad classes. A first class can be defined as global tone mapping. This involves applying compressive tone mapping function(s) (e.g., sigmoidal functions or logarithmic functions) independently to the luminance values of each pixel of the image or image sequence. A second class can be defined as local tone mapping (also known as spatially varying tone mapping). Local tone mapping takes into account, for each pixel, the luminance value of that pixel, as well as information from its neighboring pixels.

When the range of luminance values of an input image is reduced, it is usually reduced by a very large amount, after the use of a tone mapping operator adapted for HDR to LDR conversion. For example, existing tone mapping HDR to LDR operators compress full luminance channel information (e.g., maximum 4000 nits content) to fit into the very low ranges of the legacy LDR displays (e.g., 100 nits content). On the opposite, a HDR to lower-HDR tone mapping operator may be required to reduce the range by a significantly smaller factor, e.g., (from maximum 4000 nits to 1000 nits for range compression between different HDR displays). The existing HDR to lower-HDR tone mapping operators fail to fully reproduce the HDR sensation because they compress the whole range of luminance and rescale linearly to fit into the target display luminance range, resulting instead in a sensation of LDR content. Another problem is that existing HDR to lower-HDR tone mapping operators may also reduce contrast in highlight pixels, the effect of which may be especially noticeable when the highlights are a prevalent part of the picture.

SUMMARY OF PRESENT PRINCIPLES

Thus, there is a need for a solution that addresses the problem of reducing the dynamic range of a HDR content in a lower-HDR content corresponding to the supported range of the target display.

An aspect of present principles is directed to methods, apparatus, systems, and computer readable storage medium for obtaining a luminance component of the high dynamic range image; determining an hdr to hdr tone mapper curve; determining a tone compressed image by applying the hdr to lower-hdr tone mapper curve to the luminance component of the high dynamic range image; wherein the hdr to lower-hdr tone mapper curve comprises a first part for dark and mid-tone levels and a second part for highlights, and wherein the first part has a slope s that is determined based on a measure of uniformity of a section of a histogram of the image corresponding to a bright region of the image.

This method for tone mapping a high dynamic range input image having a peak input luminance $I_{max}$ into a lower high dynamic range output image having a lower peak output luminance $I_o^{max}$ comprises notably:

obtaining a luminance component of the input image;

determining a hdr to lower-hdr tone mapper curve;

determining said output image by applying the hdr to hdr tone mapper curve to the luminance component of the input image;

wherein the hdr to lower-hdr tone mapper curve comprises a first linear part for dark and mid-tone levels and a second non-linear part for highlights, and wherein the first linear part has a slope s that is a monotonically non-increasing function of a measure of uniformity of distribution of obtained luminance values in a bright region of a luminance histogram of the obtained luminance values of the input image such that said slope s will be lower than or equal to 1 but higher than or equal to the ratio $s_l$ of the peak output luminance $I_o^{max}$ and the peak input luminance $I^{max}$.

Preferably, the bright region of the luminance histogram is defined as being delineated between a lower bound $\zeta_l$ and an upper bound $\zeta_u$ positioned in the luminance range of the input image, wherein the lower bound $\zeta_l$ is proportional to the ratio $s_l$ of the peak output luminance $I_o^{max}$ and the peak input luminance $I^{max}$.

Preferably, a mid-to-high threshold τ is defined as separating the first linear part and the second non-linear part of the tone mapper curve is smaller than the peak output luminance $I_o^{max}$. This mid-to-high threshold τ is preferably large enough to cover more than (100−n) % of the pixels of this frame or image, wherein n is superior or equal to 2.

Preferably, the measure of uniformity of distribution of obtained luminance values in the bright region is determined as a ratio between the mean μ and standard deviation υ of the number of pixels of said input image over bins of the bright region of said luminance histogram.

In a specific embodiment, the slope s is determined as follows $$s = \begin{cases} 1 & t \le \varrho_1 \\ (-3t^2 + 2t^3 + 1)(1 - s_l) + s_l & \varrho_1 < t < \varrho_2 \\ s_l & t \ge \varrho_1 \end{cases}$$

where $$t = \frac{\frac{\mu}{\upsilon} - \varrho_1}{\varrho_2 - \varrho_1},$$

and
where parameters $\varrho_1$, $\varrho_2$ define the transition points of the curve representing the slope s as function of parameter t.

Information representative of the hdr to hdr tone mapper curve may be signaled. The signaling may be performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header. The information from prior video frames may be applied using leaky integration based on a threshold between the first part and the second part.

BRIEF SUMMARY OF THE DRAWINGS

The features and advantages of the present invention may be apparent from the detailed description below when taken in conjunction with the Figures described below.

DETAILED DESCRIPTION

The present principles are directed to methods, apparatus and systems for HDR to lower-HDR tone mapping. An example is directed to solving the problem of reducing the dynamic range of a HDR content with respect to the lower supported range of the target display.

An example is directed to determining a mid-and-dark compression factor for the mid-tones and dark pixels for an HDR to lower-HDR tone mapping operator, i.e. a slope of a linear part of the luminance compression curve. An example is directed to methods and apparatus for determining the optimal slope for a linear part of a tone-mapper, where the determination may be based on content. Similarity with an HDR input may be maintained after tone-mapping, while balancing the contrast in highlights in order to optimally reproduce the sensation of viewing HDR content, albeit on lower-high dynamic range displays. A director's intent may also then be reproduced, for example, a content may be graded on a 4000 nit reference HDR display to be optimally reproduced on a 1000 or 1500 nit consumer lower-HDR display.

An aspect of present principles addresses the problem of diminishing quality of dynamic range of HDR content when converted to a target display with a lower-high dynamic range. An aspect of present principles relates to reproducing the HDR sensation despite the tone compression to fit into the target display range.

An aspect of present principles relates to methods, apparatuses and systems for maintaining the HDR content similar to the HDR source, while compressing the HDR content only for very high ranges of information. This allows having the sensation of viewing HDR content, although on lower dynamic range displays. It also enables maintaining a director's intent. For instance, content graded on a 4000 nit reference display would be reproduced with good quality for display on a 1000 or 1500 nit consumer display.

The tone mapping operator having, in accordance of present principles, a linear part in the mid-and-dark part of the luminance range, may be utilized in a variety of applications. For example, the tone mapping operator may be utilized in a post-production studio, to aid in the regrading process of HDR content to produce a secondary HDR grade with a lower peak luminance. Alternatively, on the consumer side, an HDR to lower-HDR tone mapping operator could be incorporated into an HDR consumer display or could be integrated into a set-top box.

1/ Defining the Tone-Mapping Curve:

Luminance information for a pixel of a HDR to lower-HDR tone mapped content may be determined based on a transformation of the HDR received content. In one example, the received HDR content may be formatted for a standard RGB color space. In one example, if the color content of a pixel i is represented in the sRGB color space by $R_i$, $G_i$, $B_i$ values, the calculation of a luminance value I for pixel i may be determined in a manner known per se by:

$$I^i = 0.2126 \times R^i + 0.7152 \times G^i + 0.0722 \times B^i \qquad \text{Equation No. 1:}$$

Luminance values can be derived from any other RGB color spaces in a similar manner, albeit with different constants that depend on the definition of each individual RGB color space. Example RGB color spaces are ISO RGB, Extended ISO RGB, scRGB, Adobe RGB 98, Adobe Wide Gamut RGB, Apple RGB, ROMM RGB, ProPhoto RGB, CIE (1931) RGB, as well as RGB spaces defined in standards ITU-R Rec. BT 709, ITU-R Rec. BT 2020, ITU-R Rec. BT 470, SMPTE RP 145, and SMPTE 170M.

Alternatively, the luminance channel of any appropriate color space, such as Yuv, Yu'v', YCbCr, YPbPr, Y'DbDr, Y'CC, CIE Yxy, CIE Lab, CIE Luv, CIE LCh, IPT, Y'I'Q', EBU Y'U'V' may be utilized instead. In this case, the image is transformed into such a color space, processing is applied to the luminance channel, and afterward a further color space transform may convert the image to a destination color space (which in one example may be an RGB color space).

The range of luminance values of colors in an image may be split into three sub-ranges, broadly classified as "darks", "high-lights" and "mid-tones." These intuitively correspond to the darkest parts of the image, the brightest parts of the image (light sources and highlights, usually), and the mid-tones which is everything that is not a highlight or a dark tone. The cross-over point between dark-tones and mid-tones is difficult to determine analytically, and may be left as a fuzzy transition region. The same is true for the cross-over point between the mid-tones and the high-lights. However, approximate cross-over points may be determined in a manner known per se on the basis of the analysis of an image's luminance histogram, leading to three sections of the image's tone histogram that correspond to the dark-tones, mid-tones and the high-lights. An important feature of the HDR to lower-HDR tone mapper described below relates to compressing the dark and mid-tone levels linearly (or not change if possible), so that the intent of the photographer is kept as unchanged as possible in these tone levels, and to compressing non-linearly the highlights. The proposed tone mapper may be applied to a luminance channel of colors, and the chromatic information of colors is corrected secondarily in a manner know per se.

In one example, the underlying HDR to lower-HDR tone mapping curve may include a "first" part of a curve for pixels with mid-tones and dark pixels and a "second" non-linear compressive part of highlights. The first and second parts may be separated by a mid-to-high cross-over point corresponding for instance to a fixed mid-to-high threshold.

The HDR to lower-HDR tone mapper can be represented by a two-part tone-mapping curve, with (i) a first linear part for the darks and mid-tones and (ii) a second non-linear part for the remaining highlights. The first linear part is then characterized by its dark-and-mid slope s. The determination of this two-part tone-mapping curve may notably comprise the following steps:

1. Analyzing an image or video frame to determine whether the slope s of the first linear part of the curve should have a value of 1 (no luminance compression) or should have a value less than 1 (actual luminance compression).
2. If the slope of the first linear part should have a value less than 1, determining the value s of this slope of the first part of the tone-mapping curve for the pixels of the current frame.
3. Applying leaky integration to the current frame in order to avoid flicker between frames (an option that is recommended).
4. Adjusting the second part of the tone-mapping curve that will reduce the dynamic range of the highlights according to the target dynamic range. The second part of the curve is adjusted so that it connects smoothly with the first part of the tone-mapping curve that was adjusted at 1-2 above.

A way the slope s of the first linear part is computed according to the invention will be detailed below in section 3.

In one example, the maximum luminance value of the input HDR content is $I^{max}$ and the maximum producible luminance value by the output HDR display is $I_o^{max}$. In one example, the values for these variables are $I^{max}$=4000 nits and $I_o^{max}$=1500 nits.

The HDR to lower-HDR tone mapping operator may utilize a C1 tone-mapping function that is designed for the full range of the input luminance. As used herein, a "C1" tone mapping function is defined as a function with its first derivative being defined and continuous everywhere in the open interval of the input of the derivative function domain. Of course, the smoothness criterion is not defined at luminance values I=0 and $I=I^{max}$.

In one example, the desired input tone-mapper function is a function denoted $f_{new}(I, \tau)$. In one example, for a given frame or image of a content, this function $f_{new}(I, \tau)$ scales linearly the input luminance values I smaller than a mid-to-high threshold $\tau$ by a compression factor s (frequently s=1), and compresses the luminance values larger than this threshold $\tau$ according to a variation of the function $f_{new}$. In one example, the tone-mapper operator $f_{new}$ is defined as follows:

$$f_{new}(I, \tau) = \begin{cases} sI & \text{if } I \leq \tau \\ \dfrac{a(I-\tau)+c}{(I-\tau)+d} & \text{otherwise} \end{cases} \quad \text{Equation No. 2}$$

In this example, note that the second non-linear part of the tone-mapping curve corresponds to the well-known photographic tone-mapper operator $$f(I) = \frac{I}{I+1}.$$

In one example, the three parameters a, c, d need to be set to satisfy the following three conditions to obtain the C1 tone-mapper function $f_{new}(I, \tau)$:

i. The maximum input $I^{max}$ should map to the maximum output $I_o^{max}$, therefore $$f_{new}(I^{max}, \tau) = I_o^{max} \quad \text{Equation No. 3:}$$

ii. At $I=\tau$, the tone-mapper needs to be continuous, therefore $$f_{new}(\tau, \tau) = s\tau \quad \text{Equation No. 4:}$$

iii. Also, at $I=\tau$, the gradient of the tone-mapper needs to be continuous, therefore.

$$\frac{\partial f_{new}}{\partial I}(\tau, \tau) = s \quad \text{Equation No. 5}$$

Solving the system for the three unknowns, a, c, d, results into the following:

$$d = \frac{(I^{max} - \tau) \times (s\tau - I_o^{max})}{I_o^{max} - sI^{max}} \quad \text{Equation No. 6}$$

$$c = s\tau d \quad \text{Equation No. 7}$$

$$a = \frac{I_o^{max}(I^{max} - \tau + d) - c}{I^{max} - \tau} \quad \text{Equation No. 8}$$

In another example, the methodology described above in connection with Equation Nos. 2 may be implemented through a tone-mapper Look-Up-Table with sampled input luminance values and corresponding output luminance values for real-time tone-mapping.

2/ Computing Mid-to-High Threshold for Each Frame of a Video Content:

The mid-to-high threshold $\tau$ of a frame or image may be notably determined as being smaller than a default threshold $\tau_0$ defined by:

$$\tau_0 = \eta I_o^{max}, \qquad \text{Equation No. 9:}$$

with an example of $\eta=0.8$, and as being large enough to cover more than $(100-n)$ % of the pixels of this frame or image (with $n>0$, and, in one example, $n=2$), to prevent clipping very high input luminance values. Such a condition is equivalent to have less than n % of these pixels having luminance values between $\tau_0$ and $I^{max}$. In one example, for most natural scenes, very high luminance values of a frame or image contribute to a sparse set of pixels (high dynamic range scene histograms tend to show a highly kurtotic distribution). For such content, the following choice of the threshold tends to leave less than n % of the pixels (in one example $n=2$) to be compressed into the range of the $I_o^{max}$.

For the example of $I_o^{max}=1500$ nits, the default threshold $\tau_0$ may be initialized to 1200. These choices of $\eta$ and $n=2$ has been experimentally shown to result in subjectively pleasant output images.

To formulate the condition "large enough to cover more than $(100-n)$ % of the pixels, in a first example, the cumulative histogram of the content is used. The frequency of input luminance I is denoted by $h^I$. The value $h^I$ can be determined by calculating the histogram of the input luminance image with any chosen number of bins. The cumulative histogram for value I is denoted by $c^I$ and can be found through the following:

$$c^I = \Sigma_{s=1}^{I} h^s \qquad \text{Equation No. 10:}$$

In one example, the final threshold $\tau$ of a frame or image may be set equal to the initial value $\tau=\tau_0$ if:

$$100 \frac{c^{Imax} - c^{\tau_0}}{c^{Imax}} \leq n \qquad \text{Equation No. 11}$$

This condition formulates the case in which there are fewer than n % of pixels that have luminance values between $\tau_0$ and $I^{max}$. This allows to change luminance values of more than $(100-n)$ % of the pixels only linearly. If the condition in Equation No. 10 is not satisfied, the breaking point (i.e., the knee point in the tone-mapping curve) is reduced to increase the range of luminance values in which the input image is tone compressed.

In one example, a value of $\rho$ is denoted as follows:

$$\rho = 100 \frac{c^{Imax} - c^{\tau_0}}{c^{Imax}}, \qquad \text{Equation No. 12}$$

This parameter $\rho$ denotes the percentage of pixels that have luminance values above the mid-to-high threshold $\tau$.

Based on the determination of Equation No. 11, one example of estimating the value of the mid-to-high threshold $\tau$ is shown in the following, and comprises linearly reducing the default threshold $\tau_0$ as follows:

$$\tau = \begin{cases} \tau_0 & \rho \leq n \\ \frac{\alpha - \rho}{\alpha - n} \tau_0 & n < \rho \leq \alpha \\ 0 & \rho > \alpha \end{cases} \qquad \text{Equation No. 13}$$

where $\alpha$ denotes the maximum percentage of the pixels that can be compressed in only a small part of the dynamic range by the tone-mapper $f_{new}(I, \tau)$ without introducing artifacts. Note that, according to this equation, the final threshold $\tau$ is equal to $\tau_0$ if $\rho$ is less than n. The threshold $\tau$ is set to 0 if $\rho$ is larger than $\alpha$. Whenever $\rho$ is inbetween n and $\alpha$, the final threshold is obtained by linear interpolation between $\tau_0$ and 0.

As a consequence, for any choice of $\alpha$, the value for the mid-to-high threshold $\tau$ for $\rho > \alpha$ is set to 0 (this determination may be performed on an image level, block level, etc.). The value for the final threshold $\tau$ is beneficial because more than $\alpha$% of the pixels are touched if any threshold larger than 0 is chosen.

In the example above, the mid-to-high threshold $\tau$ is content dependent and smaller than or equal to the default threshold $\tau_0$. The mid-to-high threshold $\tau$ prevents the compression of too many pixels into a small range of $[\tau \ldots I_o^{max}]$, and results in a better visual experience.

For a set of different frames or images, i.e. for a video content, the estimated mid-to-high thresholds $\tau$ can be different for consecutive frames, and noticeable variations in the intensity of consecutive video frames ("flicker") may occur that are not desirable. This problem of flicker may be advantageously addressed by providing a correction of the mid-to-high threshold $\tau^t$ for each frame t of a video content. In one example, leaky integration can be applied to obtain a mid-to-high threshold $\tau_{new}^t$ for a frame t. The mid-to-high threshold $\tau_{new}^t$ is estimated using the mid-to-high threshold $\tau^t$, and the estimated leaky estimated mid-to-high threshold for the previous frame, i.e., $\tau_{new}^{t-1}$. One example of such estimation is as follows:

$$\tau_{new}^t = \beta \tau^t + (1-\beta)\tau_{new}^{t-1} \qquad \text{Equation No. 14:}$$

The iterative nature of Equation No. 9 implies that for every new next frame, the full history of previous estimations is considered. The user mid-to-high threshold parameter $\beta \in [0\ 1]$ controls the smoothness of $\tau_{new}$ among the frames.

In one example, luminance values are derived from RGB color values according to Equation 1. To reconstruct a tone mapped color image, a simple pixel-wise approach is utilized. The pixel-wise approach scales the RGB values $R^i$, $G^i$, $B^i$ of colors of the original HDR image according to the scale change in the luminance channel defined by the tone-mapping function $f_{new}(I, \tau)$ defined in Equation 2, as follows:

$$R_{out}^i = f_{new}(I^i, \tau_{new}^t)\frac{R^i}{I^i} \qquad \text{Equation No. 15a}$$

$$G_{out}^i = f_{new}(I^i, \tau_{new}^t)\frac{G^i}{I^i} \qquad \text{Equation No. 15b}$$

$$B_{out}^i = f_{new}(I^i, \tau_{new}^t)\frac{B^i}{I^i} \qquad \text{Equation No. 15c}$$

The reconstruction of a color image may also be parameterized by parameter se which controls the amount of saturation, as follows:

$$R_{out}^i = f_{new}(I^i, \tau_{new}^t)\left(\frac{R^i}{I^i}\right)^{se} \qquad \text{Equation No. 16a}$$

-continued $$G_{out}^i = f_{new}(I^i, \tau_{new}^i)\left(\frac{G^i}{I^i}\right)^{se}$$
Equation No. 16b $$B_{out}^i = f_{new}(I^i, \tau_{new}^i)\left(\frac{B^i}{I^i}\right)^{se}$$
Equation No. 16c In one example, the tone mapping operator could be incorporated into a consumer electronics device such as a set-top box, a television, a monitor, a laptop, a phone, a tablet, a smartphone display, etc. In this case, the tone mapping algorithm may be supplied with meta-data to determine the visual appearance of its output.

3/ Computing the Slope s of the Linear Part of the Tone Mapping Curve:

Again, an example of present principles is directed to an HDR to lower-HDR tone mapper that changes a slope s of the first part of the tone-mapping curve based on the content of the input image or video frame.

In one example, the slope s of the first part may be determined based on a shape of a luminance histogram of the input image or video frame, notably based on a shape of a long tail in a bright region of this histogram.

An aspect of present principles is then directed to analyzing a luminance histogram in order to determine the presence of uniform distribution of luminance values in a bright region of this histogram. The slope s may then be determined based on a measure of uniformity of distribution of luminance values in this bright region.

In one example, a luminance histogram $\text{hv}(I, B, 1)$ of the input image I is determined for a given number of histogram bins B distributed along the whole high dynamic range of the input image. In one example, the number of histogram bins B may have a value of 40. The parameter l denotes a vector of the bin centers of the histogram. A histogram is normally represented as an array with in each array element a value. The interpretation is that the array index corresponds to a small range of luminance values, and the value stored in this array element (the 'bin value') represents the number of pixels that are within this range of luminance values. The value of the bin may correspond to the number of pixels of a histogram that falls into the respective bin. The histogram is previously calculated and is denoted in the preceding text by $\text{hv}(I, B, 1)$.

In one example, the bright region of the image histogram is defined by boundaries $\zeta_l$, $\zeta_u$ corresponding respectively to the lower luminance value and the higher luminance value of this bright region. These boundaries delineate the range of tones that will be analyzed for the measure of uniformity of distribution and thereby also delineate the bright region of the histogram to consider to compute the slope s.

In one example, the lower bound $\zeta_l$ is determined as follows:

$$\zeta_l = B\frac{\tau_0}{I^{max}},$$
Equation No. 17 giving, when combined with Equation No. 9:

$$\zeta_l = B\eta\frac{I_0^{max}}{I^{max}}$$
Equation No. 18 where B is the number of bins of the histogram, where the maximum luminance value of the input HDR content $I^{max}$ is provided for instance as metadata with the video content, where the maximum producible luminance output value $I_o^{max}$ is typically derived from the peak display luminance of the target display. Equation No. 18 means that the lower bound $\zeta_l$ is proportional to the ratio $s_l$ of the peak output luminance $I_o^{max}$ and the peak input luminance $I^{max}$.

In one example, the upper bound $\zeta_u$ is determined as follows:

$$\zeta_u = B\pounds$$
Equation No. 19

The parameters η (already defined above) and £ should both be in the range between 0 and 1. Moreover, £ should be superior to $$\eta\frac{I_0^{max}}{I^{max}}.$$

Based on observations of graded content, a good value of η is 0.8. A default value of the parameter £ may be set to 0.75.

Further, it would be possible to use metadata to set the parameters η and £, rather than use default values. This may be useful in cases where the director of photography wishes to provide guidance as to how content may be tone mapped in such a way to preserve the director's intent. In that case, these parameters are specified during (post-) production and will be attached to the content as metadata. A device receiving this content will then be able to adjust the tone reproduction parameters on this basis.

Note that the mid-to-high threshold delineating the first and second parts of the tone mapping curve as described above is generally different from the lower bound and from the higher bound delineating the bright region.

In one example, the luminance histogram bins of the input image are analyzed between the boundaries $\zeta_l$, $\zeta_u$, i.e. in the so-called bright region. See FIG. 7.

Figure 7:
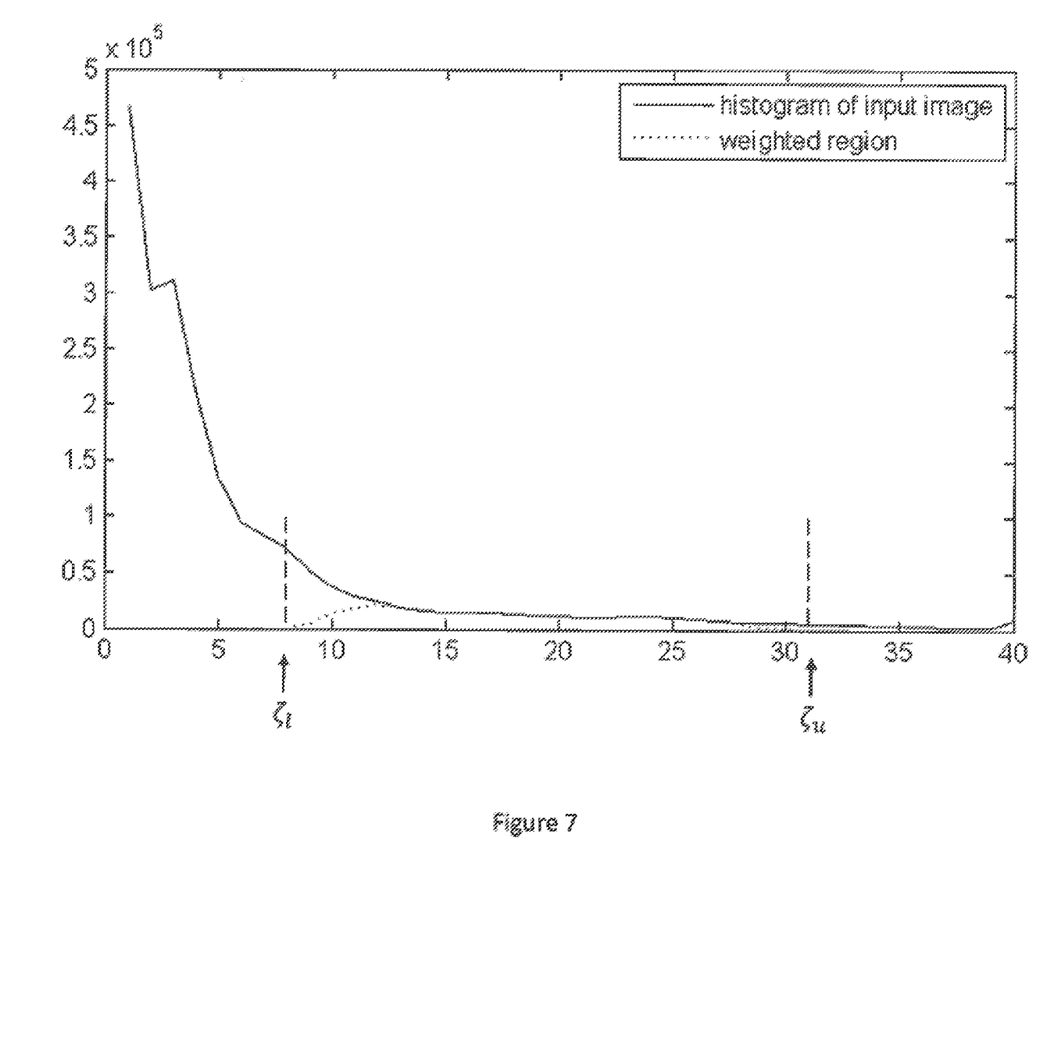
FIG. 7 illustrates a histogram of luminance values of an input image to be tone-mapped according to the diagram of FIG. 3, with, between a lower bound $\zeta_l$ and an upper bound $\zeta_u$ delineating a bright region of this histogram, weighted values of this histogram that are used to compute the slope s of the linear part of the tone-mapping curve.

In an alternative example, a weight function $M(l, \zeta_l, \zeta_u, B)$ may be determined notably based on these boundaries $\zeta_l$, $\zeta_u$. The weight function can determine a weight for each bin B of the luminance histogram, such that, when applied to each bin B, the effect of the histogram values that have a value either lower than the lower boundary $\zeta_l$ or higher than the upper boundary $\zeta_u$ are removed. The dotted line on FIG. 7 illustrates such a weighted distribution of luminance values in the bright region.

For a System-on-Chip (SOC) manufacturer, it may be expensive to implement conditional phrases, thereby it may be expensive to use the two thresholds $\zeta_l$, $\zeta_u$ in SOC devices. In one example, entire histogram may be weighed with weights that are equal to 1 between the two thresholds $\zeta_l$, $\zeta_u$, and 0 elsewhere. Obtaining the weights may provide a more robust solution to content variation than using two hard thresholds $\zeta_l$, $\zeta_u$.

In one example the weighting function is determined as the convolution of a square window function $\varepsilon(l, \zeta_l, \zeta_u, B)$ (with values set to 1 for l between and $\zeta_l$ and $\zeta_u$, and 0 elsewhere) with a discrete symmetric hamming window $q(l, L)$ of the support of Equation No. 15.

$$L = I^{max}/8 \times B.$$

Figure 5:
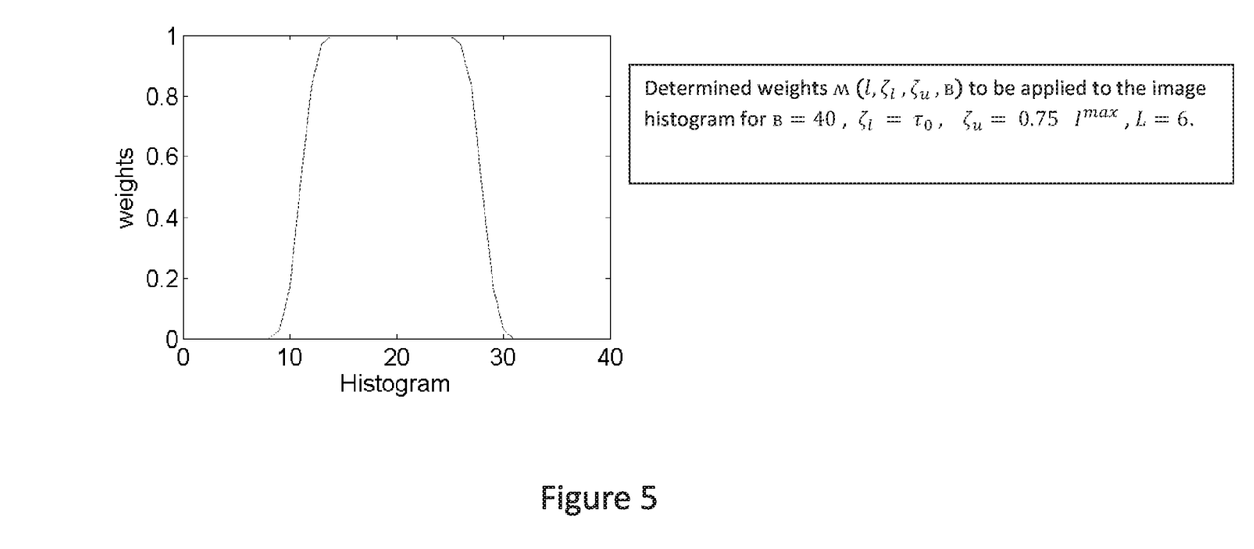
FIG. 5 is a diagram depicting an exemplary plot in accordance with present principles.

In one example, FIG. 5 illustrates determined weights for a histogram with B=40.

The weights $M(l, \zeta_l, \zeta_u, B)$ may be determined through to the following equation:

$$M(l,\zeta_l,\zeta_u,B) = \mathbf{e}(l,\zeta_l,\zeta_u,B) * \mathbf{q}(l,L) \quad \text{Equation No. 21:}$$

where * denotes the convolution operator, and the discrete hamming window $\mathbf{q}(l, L)$ is determined as follows:

$$\mathbf{q}(l, L) = 0.54 - 0.46 \times \cos\left(2\pi \frac{l}{L}\right), \quad 0 \leq l \leq L. \quad \text{Equation No. 22}$$

In one example, a histogram $\text{h}\upsilon(I, B, l)$ is multiplied by the weights $M(l, \zeta_l, \zeta_u, B)$, resulting in the following weighting to the histogram bins:

$$\text{h}\upsilon'(I,B,l) = \text{h}\upsilon(I,B,l) M(l,\zeta_l,\zeta_u,B) \quad \text{Equation No. 23:}$$

FIG. 5 illustrates determined weights $M(l, \zeta_l, \zeta_u, B)$ to be applied to the image histogram for $B=40$, $\zeta_l=\tau_0$, $\zeta_u=0.75 I^{max}$, $L=6$.

The histogram bins between the boundaries $\zeta_l$, $\zeta_u$, or the weighted histogram of Eq. No. 18 forms a suitable basis for measuring the uniformity of the distribution of luminance values in order to compute the slope s. While any method for determining uniformity of the corresponding set of luminance values may be applied, in one example, the uniformity may be determined based on the mean $\mu$ and standard deviation $\upsilon$ of the weighted histogram (or of the histogram between the boundaries $\zeta_l$, $\zeta_u$), which may be determined as follows:

$$\mu = \text{avg}_l\{\text{h}\upsilon'(I,B,l)\} \quad \text{Equation No. 24:}$$

$$\upsilon = \text{std}_l\{\text{h}\upsilon'(I,B,l)\} \quad \text{Equation No. 25:}$$

In one example, the measure of uniformity is then given by the ratio of the mean and the standard deviation of the weighted histogram (or non-weighted histogram between the boundaries) as follows $$\text{measure of uniformity} = \mu/\upsilon \quad \text{Equation No. 26:}$$

The measure of uniformity may correlate with a suitable determination of the slope s of the first linear part of the tone mapping operator. More specifically, this slope s is a monotonically non-increasing function of this measure of uniformity. In one example illustrated on FIG. 6, the relationship between slope s and the measure of uniformity $\mu/\upsilon$ is determined in a non-linear manner, for instance as follows.

Figure 6:
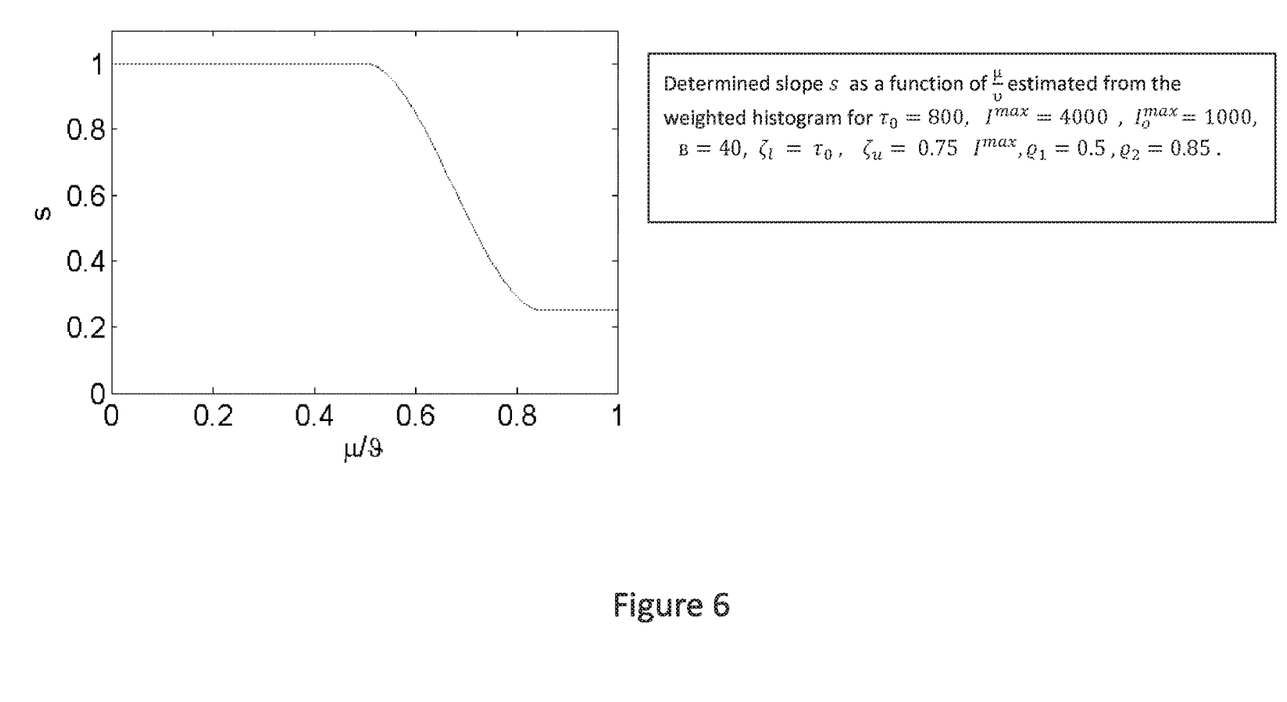
FIG. 6 is a diagram depicting an exemplary plot in accordance with present principles.

In one example, the slope s can be determined as a function of $\mu/\upsilon$ as follows:

$$s = \begin{cases} 1 & t \leq \varrho_1 \\ (-3t^2 + 2t^3 + 1)(1-s_l) + s_l & \varrho_1 < t < \varrho_2 \\ s_l & t \geq \varrho_1 \end{cases} \quad \text{Equation No. 27}$$

In one example, the parameter $s_l$ may be determined as follows:

$$s_l = I_o^{max}/I^{max} \quad \text{Equation No. 28:}$$

The parameter $s_l$ ($<1$ according to above $I_o^{max}$ and $I^{max}$ definition) ensures that the slope s of the linear part of the tone mapping curve will not be lower than the ratio of the peak output luminance $I_o^{max}$ and the peak input luminance $I^{max}$. This may result in avoiding an undesirably large reduction of contrast in the darks.

The parameter t is based on the measure of uniformity $\mu/\upsilon$, as follows:

$$t = \frac{\frac{\mu}{\upsilon} - \varrho_1}{\varrho_2 - \varrho_1} \quad \text{Equation No. 29}$$

This equation used to apply a form of rescaling to the measure of uniformity $$\frac{\mu}{\upsilon}$$

using the constants $\varrho_1$, $\varrho_2$. In one embodiment, these constants may be set to $\varrho_1=0.5$, $\varrho_2=0.85$. In Equation 27 these same constants serve as transition points delineating the non-linear part from the constant parts.

In one example, FIG. 6 illustrates the determined slope s as a function of $$\frac{\mu}{\upsilon}.$$

Block Diagram of the Tone-Mapping Method Described Above:

The examples described above may be implemented within the figures described below.

Figure 1:
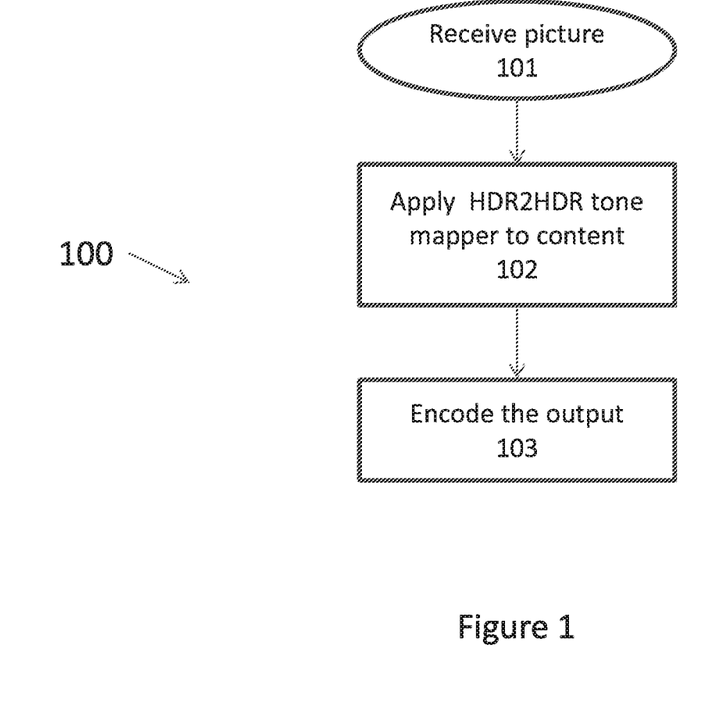
FIG. 1 is a diagram depicting an exemplary method of encoding a picture in accordance with present principles.

FIG. 1 is a diagram depicting an exemplary method 100 for encoding image or video content in accordance with present principles.

Method 100 may include receiving and encoding a picture. The picture may be encoded into a bit stream using any encoding technique (e.g., HEVC, AVC). Method 100 may be performed in any type of working flow, such as DVB or ATSC standard based distribution workflows, production or authoring workflows, digital video camcorders.

In one example, the method 100 includes receiving a picture at block 101. The picture may be part of a sequence of video images or pictures, e.g., for HDR video. Block 101 may receive information regarding the properties of the picture, including linear light RGB information. The picture may be captured using tri-chromatic cameras into RGB color values composed of three components (Red, Green and Blue). The RGB color values depend on the tri-chromatic characteristics (color primaries) of the sensor. The picture may include image side information such as color primaries of the sensor, maximum and minimum luminance peak of the captured scene. Block 101 may then pass control to block 102, including providing any information regarding the received picture.

Block 102 may apply an HDR to lower-HDR tone mapper to the content received from block 101. The HDR to lower-HDR tone mapper may be determined in accordance with present principles. The HDR to lower-HDR tone mapper converts the dynamic range of the content to fit into the dynamic range of the display.

The HDR to lower-HDR tone mapper may be determined based on the principles described above, including in connection with Equations Nos. 1-8 and 15-16. In particular, the HDR to lower-HDR tone mapper may be used when the amount of range reduction is limited. The HDR to lower-HDR tone mapper may be determined in accordance with the principles described above, including the principles described in connection with Equation Nos. 1-24.

Block 103 may encode the output of block 102. Block 103 may encode the output in accordance with any existing encoding/decoding standard. For example, block 103 may encode in accordance with the High Efficiency Video Coding (HEVC) standard organized by the International Telecommunication (ITU) and the organization Moving Picture Experts Group (MPEG). Alternatively, the block 103 may encode in accordance with the H.264 or MPEG-4 Part 10, Advanced Video Coding (MPEG-4 AVC) organized by the International Organization for Standardization/International Electrotechnical Commission (ISO/IEC) Moving Picture Experts Group-4 (MPEG-4). Alternatively, the block 103 may encode with any other known encoding techniques.

Figure 2:
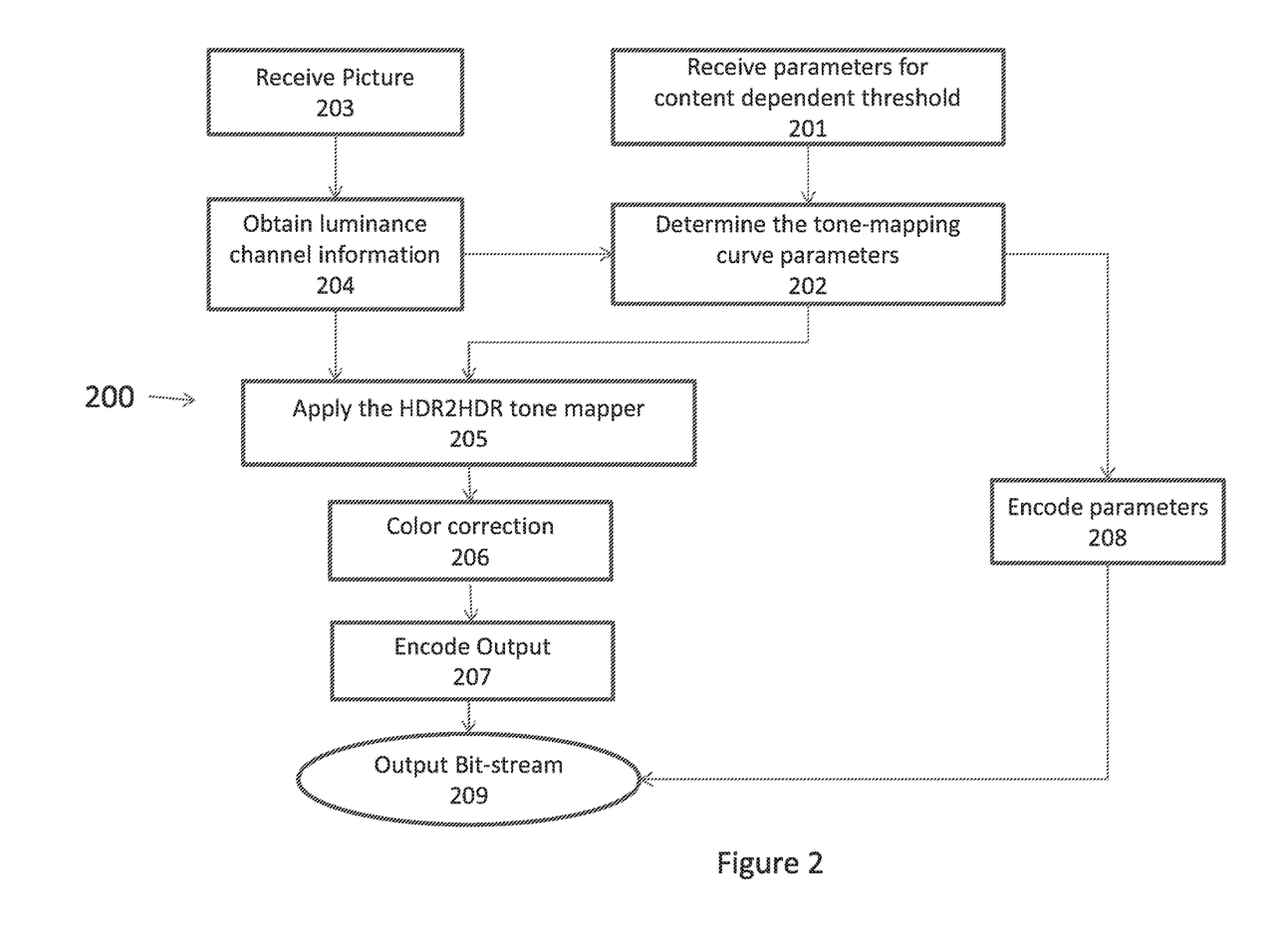
FIG. 2 is a diagram depicting an exemplary method of encoding a picture and parameters in accordance with present principles.

FIG. 2 is a diagram depicting an exemplary method 200 for encoding a picture and parameters. Method 200 includes a block 201 for receiving parameters for content dependent threshold. The parameters received may be as follows:

The peak luminance of the output content or target display $I_o^{max}$ may be supplied by the television/monitor itself. In the case a set-top box is used, this value may be signaled by a connected display device, for example through an HDMI message.

The peak luminance of the input content $I^{max}$ may be encoded as meta-data alongside the content. It may be provided as a single value per frame, per shot, or per program (television episode, movie, commercial, etc.). In an alternative example, the value of $I^{max}$ may be interpreted as the peak luminance of a display device used to generate the input content (for instance in a post-production house), or the peak luminance of a live camera used in a broadcast scenario to create the input content.

The parameter η, defined as the ratio of the default threshold $\tau_0$ and the maximum producible luminance value by the output HDR display $I_o^{max}$ (See Equation No. 9), may be sent along with the content as meta-data. In an alternative example, the threshold τ, which determines the cross-over between the linear and non-linear parts of the tone mapping curve, may be sent instead.

The parameter n, which determines the percentage of pixels to be subjected to non-linear compression, may additionally be supplied as meta-data.

The parameter α may also be supplied as meta-data.

The parameter β that is used in the leaky integration of the threshold for video content may also be included in the meta-data.

The parameter B that is the number of histogram bins may also be supplied as meta-data.

The parameter l denotes a vector of the bin centers of the histogram may also be supplied as meta-data.

The parameter £ which controls the upper-bound on the mid-tone region of the histogram may also be supplied as meta-data.

The parameters received at block 201 may be utilized so that the intent of a producer of the content (director of photography, colorist, studio) is reproduced on a wide variety of displays.

Block 202 may determine the tone-mapping curve parameters. The tone-mapping curve parameters may be determined based on Equation Nos. 6-8 and 27. Block 208 may encode the parameters determined by block 202.

Block 203 may receive a picture. In one example, block 203 may receive a picture in accordance with principles outlined in connection with block 101 of FIG. 1.

Block 204 may obtain luminance channel information of the received picture. In one example, block 204 may apply a preliminary color transform to obtain luminance channel information of the received picture. In one example, block 204 may apply a preliminary color transform to obtain the luminance channel information. In one example, block 204 may determine luminance channel information in accordance with principles described in connection with Equation No. 1. In another example, block 204 may be optional and luminance information may be directly received from block 203.

Block 205 may apply the HDR to lower-HDR tone mapper. In one example, block 205 may apply the HDR to lower-HDR tone mapper in accordance with principles described in connection with block 102 of FIG. 1. In one example, block 205 may apply the HDR2HDR tone mapper to determine an output processed image $I_o$.

Block 206 may perform color correction on the output of block 205. Block 206 may output a color corrected output image. Block 207 may encode the output of block 206.

Block 209 may output into the bitstream the parameters encoded by block 208 and the output image encoded by block 207.

Figure 3:
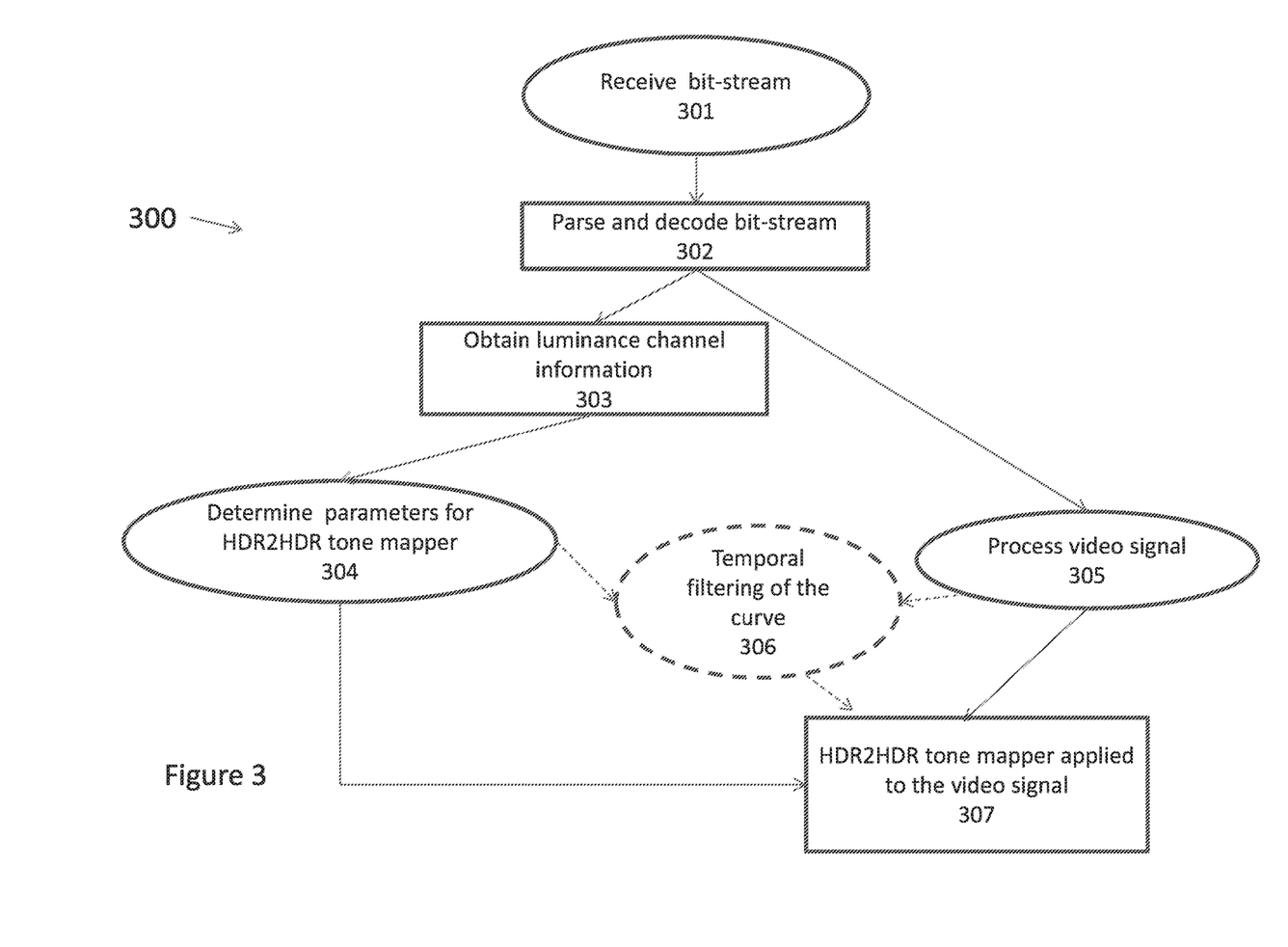
FIG. 3 is a diagram depicting an exemplary method for decoding a picture or video in accordance with present principles.

FIG. 3 is a diagram depicting an exemplary method 300 for decoding a picture or video in accordance with present principles.

Block 301 may receive a bit-stream corresponding to a video or image sequence. The received bit-stream has been encoded (e.g., using AVC, HEVC, etc. encoding). Block 301 may then pass control to block 02.

Block 302 may parse and decode the bit-stream received from block 301. In one example, the block 302 may parse and decode the bit-stream using HEVC based decoding. Block 302 may then pass control to block 303.

Block 303 may obtain luminance channel information. In one example, block 303 may be optional. In one example, block 303 may obtain luminance channel information in accordance with principles described in connection with Equation No. 1. Block 303 may then pass control to blocks 304 and 305.

Block 304 may determine the parameters for the HDR to lower-HDR tone mapper in accordance with present principles. The parameters may be any parameters discussed herewith in accordance with present principles. In one example, the parameters are determined based off of syntax contained in the bit-stream (e.g., an SEI message). The parameters may be the parameters discussed in connection with block 202. These parameters can be transmitted through the bitstream, or they can also be determined at the decoder. These parameters are estimated in one example from the histogram of the luminance information.

Block 305 may process a video signal. In one example, block 305 may process a decoded Y'CbCr video signal. In one example, block 305 may convert a Y'CbCr video signal to a R'G'B' video signal. In another example, block 305 may process a R'G'B' video signal.

Block 306 may apply the HDR to lower-HDR tone mapper to the video signal. Block 306 may be performed frame by frame using the corresponding estimated parameters. In one example block 307 may apply the HDR to lower-HDR tone mapper in accordance with principles described in connection with blocks 102 and 205. In one example, block 307 may create or receive a Look Up Table (LUT) with tabulated values and apply the LUT on the content to be mapped/demapped.

Figure 4:
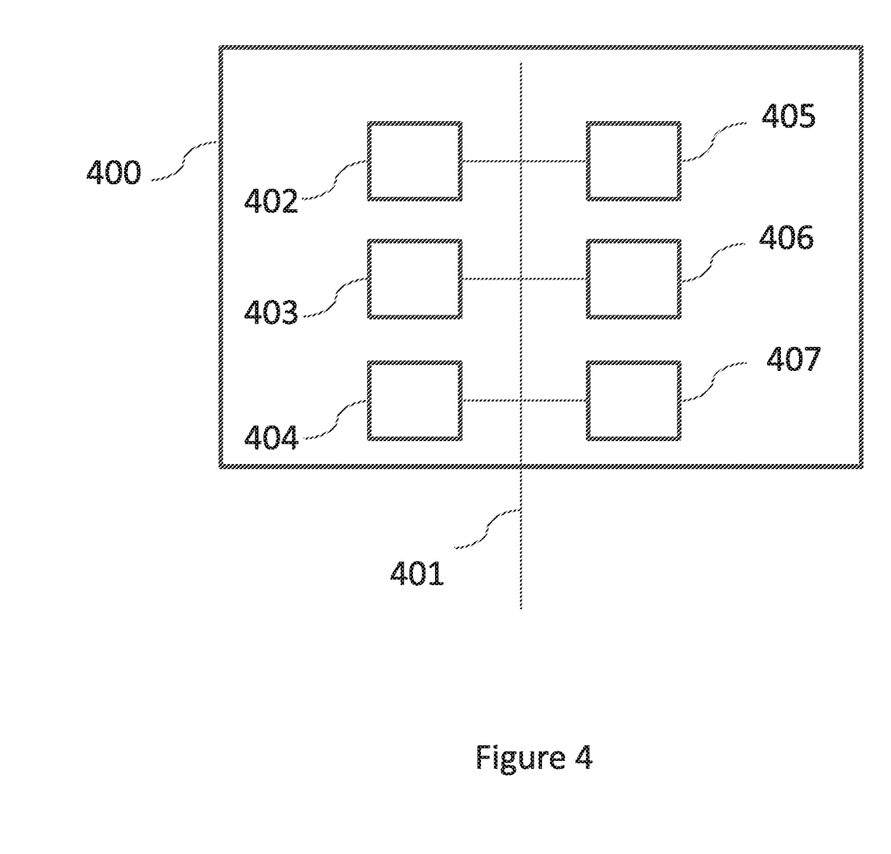
FIG. 4 is a diagram depicting an exemplary apparatus in accordance with present principles.

Architecture of a Device Configured to Implement of the Tone-Mapping Method:

FIG. 4 represents an exemplary architecture of a device 400 which may be configured to implement methods described in relation with FIG. 1-3 and Equation Nos. 1-24. In one example, FIG. 4 represents an apparatus that may be configured to implement the encoding method according to present principles, including principles described in relation to FIGS. 1-3. In one example, FIG. 4 represents an apparatus that may be configured to implement the decoding method according to present principles, including principles described in relation to FIG. 3.

Device 400 comprises following elements that are linked together by a data and address bus 401:
- a microprocessor 402 (or CPU), which is, for example, a DSP (or Digital Signal Processor);
- a ROM (or Read Only Memory) 403;
- a RAM (or Random Access Memory) 404;
- an I/O interface 405 for reception of data to transmit, from an application; and
- a battery 406 (or other suitable power source).

According to a variant, the battery 406 is external to the device. In each of mentioned memory, the word «register» used in the specification can correspond to area of small capacity (some bits) or to very large area (e.g. a whole program or large amount of received or decoded data). ROM 403 comprises at least a program and parameters. Algorithm of the methods according to the invention is stored in the ROM 403. When switched on, the CPU 402 uploads the program in the RAM and executes the corresponding instructions.

RAM 404 comprises, in a register, the program executed by the CPU 402 and uploaded after switch on of the device 400, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific example of encoding or encoder, the image or picture I is obtained from a source. For example, the source belongs to a set comprising:
- a local memory (403 or 404), e.g. a video memory or a RAM (or Random Access Memory), a flash memory, a ROM (or Read Only Memory), a hard disk;
- a storage interface (405), e.g. an interface with a mass storage, a RAM, a flash memory, a ROM, an optical disc or a magnetic support;
- a communication interface (405), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

According to different embodiments of the decoding or decoder, the decoded image is sent to a destination; specifically, the destination belongs to a set comprising:
- a local memory (403 or 404), e.g. a video memory or a RAM, a flash memory, a hard disk;
- a storage interface (405), e.g. an interface with a mass storage, a RAM, a flash memory, a ROM, an optical disc or a magnetic support;
- a communication interface (405), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, Wi-Fi® or a Bluetooth® interface); and
- a display.

According to different examples of encoding or encoder, the bitstream BF and/or F are sent to a destination. As an example, one of bitstream F and BF or both bitstreams F and BF are stored in a local or remote memory, e.g. a video memory (404) or a RAM (404), a hard disk (403). In a variant, one or both bitstreams are sent to a storage interface (405), e.g. an interface with a mass storage, a flash memory, ROM, an optical disc or a magnetic support and/or transmitted over a communication interface (405), e.g. an interface to a point to point link, a communication bus, a point to multipoint link or a broadcast network.

According to different examples of decoding or decoder, the bitstream BF and/or F is obtained from a source. Exemplarily, the bitstream is read from a local memory, e.g. a video memory (404), a RAM (404), a ROM (403), a flash memory (403) or a hard disk (403). In a variant, the bitstream is received from a storage interface (405), e.g. an interface with a mass storage, a RAM, a ROM, a flash memory, an optical disc or a magnetic support and/or received from a communication interface (405), e.g. an interface to a point to point link, a bus, a point to multipoint link or a broadcast network.

According to different examples, device 400 being configured to implement an encoding method in accordance with present principles, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

According to different examples, device 400 being configured to implement a decoding method in accordance with present principles, belongs to a set comprising:
- a mobile device;
- a communication device;
- a game device;
- a set top box;
- a TV set;
- a tablet (or tablet computer);
- a laptop;
- a display and
- a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Numerous specific details have been set forth herein to provide a thorough understanding of the present invention. It will be understood by those skilled in the art, however, that the examples above may be practiced without these specific details. In other instances, well-known operations, components and circuits have not been described in detail so as not to obscure the present invention. It can be appreciated that the specific structural and functional details disclosed herein may be representative and do not necessarily limit the scope of the present invention.

Various examples of the present invention may be implemented using hardware elements, software elements, or a combination of both. Some examples may be implemented, for example, using a computer-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

According to different embodiments, the parameterized transfer function is signaled in the picture encoded or decoded according to the invention, or in a stream including the picture. In some embodiments, an information representative of the parameterize transfer function is signaled in the picture or in the stream including the picture. This information is used by a decoding method or decoder to identify the parameterized transfer function that is applied according to the invention. In one embodiment, this information includes an identifier that is known on encoding and decoding side. According to other embodiments, this information includes parameters used as a basis for parameterized transfer functions. According to a variant of the invention, this information comprises an indicator of the parameters in the picture or in a bit-stream including the picture, based on a set of defined values. According to a variant of the invention, this information comprises an indication based on whether the parameters are signaled explicitly or whether the parameters are signaled implicitly based on a set of defined values. According to different variants of the invention, this information is included in at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

The invention also concerns apparatus for encoding and for decoding adapted to perform respectively the above methods of encoding and decoding.

The invention claimed is:

1. A method for tone mapping an input image having a first dynamic range with a peak input luminance $I_{max}$ into an output image having a second lower dynamic range with a lower peak output luminance $I_o^{max}$, the method comprising
obtaining a luminance component of the input image;
determining a tone mapper curve from the first dynamic range to the second dynamic range;
determining said output image by applying the tone mapper curve to the luminance component of the input image;
wherein the tone mapper curve comprises a first linear part for dark and mid-tone levels and a second non-linear part for highlights, and
wherein the first linear part has a slope s that is a monotonically non-increasing function of a measure of uniformity of distribution of the luminance component in a bright region of a luminance histogram of the luminance component of the input image such that said slope s will be lower than or equal to 1 but higher than or equal to a ratio $s_l$ of the peak output luminance $I_o^{max}$ and the peak input luminance $I^{max}$.

2. The method of claim 1, wherein the bright region of the luminance histogram is defined as being delineated between a lower bound $\zeta_l$ and an upper bound $\zeta_u$ positioned in a luminance range of the input image, wherein the lower bound $\zeta_l$ proportional to the ratio $s_l$ of the peak output luminance $I_o^{max}$ and the peak input luminance $I^{max}$.

3. The method of claim 1, wherein a mid-to-high threshold τ defined as separating the first linear part and the second non-linear part of the tone mapper curve is smaller than the peak output luminance $I_o^{max}$.

4. The method of claim 3, wherein the mid-to-high threshold r is large enough to cover more than (100−n) % of the pixels of a frame or image, wherein n is superior or equal to 2.

5. The method of claim 1, wherein the measure of uniformity of distribution of the luminance component in the bright region is determined as a ratio between a mean μ and a standard deviation υ of a number of pixels of said input image over bins of the bright region of said luminance histogram.

6. The method of claim 1, wherein a relationship between the slope s and the measure of uniformity is non-linear.

7. The method of claim 6, wherein the slope s is determined as follows $$s = \begin{cases} 1 & t \leq \varrho_1 \\ (-3t^2 + 2t^3 + 1)(1 - s_l) + s_l & \varrho_1 < t < \varrho_2 \\ s_l & t \geq \varrho_1 \end{cases}$$

where $$t = \frac{\frac{\mu}{\upsilon} - \varrho_1}{\varrho_2 - \varrho_1},$$

and
where parameters $\varrho_1$, $\varrho_2$ define transition points of the tone mapper curve representing the slope s as function of parameter t.

8. The method of claim 1, further comprising signaling information representative of the tone mapper curve.

9. The method of claim 8, wherein the signaling is performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

10. An apparatus for tone mapping an input image having a first dynamic range with a peak input luminance $I^{max}$ into an output image having a second lower dynamic range with a lower peak output luminance $I_o^{max}$, the apparatus comprising at least one processor configured for:
obtaining a luminance component of the input image;
determining a tone mapper curve from the first dynamic range to the second dynamic range;
determining said output image by applying the tone mapper curve to the luminance component of the input image;
wherein the tone mapper curve comprises a first linear part for dark and mid-tone levels and a second non-linear part for highlights, and
wherein the first linear part has a slope s that is a monotonically non-increasing function of a measure of uniformity of distribution of the luminance component in a bright region of a luminance histogram of the luminance component of the input image such that said slope s will be lower than or equal to 1 but higher than or equal to a ratio $s_l$ of the peak output luminance $I_o^{max}$ and the peak input luminance $I^{max}$.

11. The apparatus of claim 10, wherein the bright region of the luminance histogram is defined as being delineated between a lower bound $\zeta_l$ and an upper bound $\zeta_u$ positioned in a luminance range of the input image, wherein the lower bound $\zeta_l$ is proportional to the ratio $s_l$ of the peak output luminance $I_o^{max}$ and the peak input luminance $I^{max}$.

12. The apparatus of claim 10, wherein a mid-to-high threshold τ defined as separating the first linear part and the second non-linear part of the tone mapper curve is smaller than the peak output luminance $I_o^{max}$.

13. The apparatus of claim 12, wherein the mid-to-high threshold r is large enough to cover more than (100–n) % of the pixels of a frame or image, wherein n is superior or equal to 2.

14. The apparatus of claim 10, wherein the measure of uniformity of distribution of the luminance component in the bright region is determined as a ratio between a mean μ and a standard deviation υ of a number of pixels of said input image over bins of the bright region of said luminance histogram.

15. The apparatus of claim 10, wherein a relationship between the slope s and the measure of uniformity is non-linear.

16. The apparatus of claim 15, wherein the slope s is determined as follows $$s = \begin{cases} 1 & t \leq \varrho_1 \\ (-3t^2 + 2t^3 + 1)(1 - s_l) + s_l & \varrho_1 < t < \varrho_2 \\ s_l & t \geq \varrho_1 \end{cases}$$

where $$t = \frac{\frac{\mu}{\upsilon} - \varrho_1}{\varrho_2 - \varrho_1},$$

and
where parameters $\varrho_1$, $\varrho_2$ define transition points of the tone mapper curve representing the slope s as function of parameter t.

17. The apparatus of claim 10, wherein said at least one processor is further configured for comprising signaling information representative of the tone mapper curve.

18. The apparatus of claim 17, wherein the signaling is performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

19. An electronic device comprising the apparatus of claim 10.

20. The electronic device according to claim 19, selected from a group consisting of a mobile device, a communication device, a game device, a tablet, a laptop, a camera, an encoding chip, and a server.

21. A computer program product stored on a non-transitory computer readable medium comprising program code instructions to execute the steps of the method according to claim 1 when the program code instructions are executed on a computer.

* * * * *